(12) United States Patent
Tang et al.

(10) Patent No.: US 8,913,847 B2
(45) Date of Patent: Dec. 16, 2014

(54) REPLACEMENT OF A PERSON OR OBJECT IN AN IMAGE

(75) Inventors: Feng Tang, Palo Alto, CA (US); Suk Hwan Lim, Palo Alto, CA (US); Hui Chao, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 41 days.

(21) Appl. No.: 13/642,345

(22) PCT Filed: Jul. 26, 2010

(86) PCT No.: PCT/US2010/043206
§ 371 (c)(1),
(2), (4) Date: Oct. 19, 2012

(87) PCT Pub. No.: WO2011/152841
PCT Pub. Date: Dec. 8, 2011

(65) Prior Publication Data
US 2013/0094780 A1 Apr. 18, 2013

Related U.S. Application Data

(60) Provisional application No. 61/350,470, filed on Jun. 1, 2010.

(51) Int. Cl.
*G06K 9/36* (2006.01)
*G06T 11/60* (2006.01)
*G06T 7/00* (2006.01)
*H04N 5/272* (2006.01)

(52) U.S. Cl.
CPC .............. *G06T 7/0022* (2013.01); *G06T 11/60* (2013.01); *H04N 5/272* (2013.01)

USPC .......................................... 382/284

(58) Field of Classification Search
USPC ................... 358/537, 538, 452, 453; 382/284
See application file for complete search history.

(56) References Cited

U.S. PATENT DOCUMENTS

| 7,724,952 | B2 | 5/2010 | Shum et al. | |
|---|---|---|---|---|
| 7,876,947 | B2* | 1/2011 | Lee et al. | 382/131 |
| 2004/0051716 | A1* | 3/2004 | Sevigny | 345/589 |
| 2005/0100200 | A1* | 5/2005 | Abiko et al. | 382/124 |
| 2006/0232607 | A1* | 10/2006 | Davignon et al. | 345/629 |
| 2007/0279494 | A1* | 12/2007 | Aman et al. | 348/169 |
| 2008/0019576 | A1* | 1/2008 | Senftner et al. | 382/118 |
| 2008/0124056 | A1* | 5/2008 | Concotelli | 386/124 |
| 2008/0181457 | A1* | 7/2008 | Chattopadhyay et al. | 382/103 |

FOREIGN PATENT DOCUMENTS

KR 10-2003-0026528 4/2003

* cited by examiner

*Primary Examiner* — Gregory F Cunningham (57) ABSTRACT

Disclosed herein are a system and a method that use a background model to determine and to segment target content from an image and replace them with different content to provide a composite image. The background model can be generated based on image data representing images of a predetermined area that does not include traversing content. The background model is compared to image data representing a set of captured images of the predetermined area. Based on the comparison, portions of an image that differs from the background model are determined as the traversing content. A target content model is used to determine the target content in the traversing content. The target content determined in the images is replaced with different content to provide a composite image.

12 Claims, 5 Drawing Sheets

REPLACEMENT OF A PERSON OR OBJECT IN AN IMAGE

BACKGROUND

There are many applications in which a user may want to segment a person or object from an image and replace them with other content. For example, the user may want to replace a person or an object (including an animal) in an image with different content, such as but not limited to another version of the same person, a different person, a different object, or a virtual character.

Examples of techniques for segmenting a person or an object from an image include a Bayesian matting and a Poisson matting, where a rough mask of the object to be segmented, called a trimap, is used. See, e.g., Y. Chuang at al., 2001, "A Bayesian Approach to Digital Matting," *CVPR* 2: 264-271; J, Sun et al., 2004, "Poisson matting" *ACM Trans. Graph.*, 23(3): 315-321. Generating a trimap may require a lot of user interaction. In Lazy snapping, a user draws strokes to specify example area of the foreground and background for the segmentation. Y. Li et al., 2004, "Lazy snapping" *ACM Transactions on Graphics (TOG)*, 23: 303-308. In GrabCut, instead of a user-specified example area, a bounding box is used to indicate where the object to be segmented might be and the algorithm can infer the salient area within the bounding box to be the foreground. C. Rother et al., 2004, "Grab-Cut: Interactive foreground extraction using iterated graph cuts," *ACM Trans. Graph.*, 23: 309-314. In SoftScissors, a user moves a stroke along the boundary of an object to facilitate segmenting the object, and may requires a lot of user interaction. J. Wang et al., 2007, "Soft scissors: an interactive tool for real-time high quality matting," *ACM Trans. Graph*, 26(3): 9. In flash Matting, two images (one captured with a flash and one without a flash) are used to segment an object. A special device for capturing, which is not realistic in many practical applications, J. Sun et al., "Flash Cut: Foreground Extraction with Flash and No-flash Image Pairs," *CVPR* 2007.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

An "image" broadly refers to any type of visually perceptible content that may be rendered on a physical medium (e.g., a display monitor or a print medium). Images may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image.

The term "image forming element" refers to an addressable region of an image. In some examples, the image forming elements correspond to pixels, which are the smallest addressable units of an image. Each image forming element has at least one respective "image value" that is represented by one or more bits. For example, an image forming element in the RGB color space includes a respective image value for each of the colors (such as but not limited to red, green, and blue), where each of the image values may be represented by one or more bits.

A "computer" is any machine, device, or apparatus that processes data according to computer-readable instructions that are stored on a computer-readable medium either temporarily or permanently. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" refers to any medium capable storing information that is readable by a machine (e.g., a computer). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

As used herein, the term "includes" means includes but not limited to, the term "including" means including but not limited to. The term "based on" means based at least in part on.

The examples that are described herein provide a system and a method for segmenting a person or an object from an image and replace them with other content. In one example, a system and a method are provided for replacing a person or an object (including an animal) in an image with different content, such as but not limited to a different version of the same person or the same object, a different person, a different object, or a virtual character.

A system and a method provided herein uses background modeling, face detection, skin detection and cloth detection to segment a person or object of interest from an image. The system and method use information obtained with a target content model (such as a person model). The system and method can greatly reduce the amount of user interactions required to segment a person or object of interest. The system and method use background modeling to facilitate the image segmentation. The system and method can be used to segment a person or an object (including an animal) from an image and replace them with different content. Examples of different content include a different version of the same person or the same object, a different person, a different object, or a virtual character. In any of the systems and methods disclosed herein, an object can be an animal. In any of the systems and methods disclosed herein, an image can be modeled as having image layers, where one or more of the image layers are components of a foreground corresponding to the person or object to be removed or replaced, and one or more other ones of the image layers are components of a background corresponding to parts of the image that are outside of the image area that correspond to the person or object to be removed or replaced.

Figure 1:
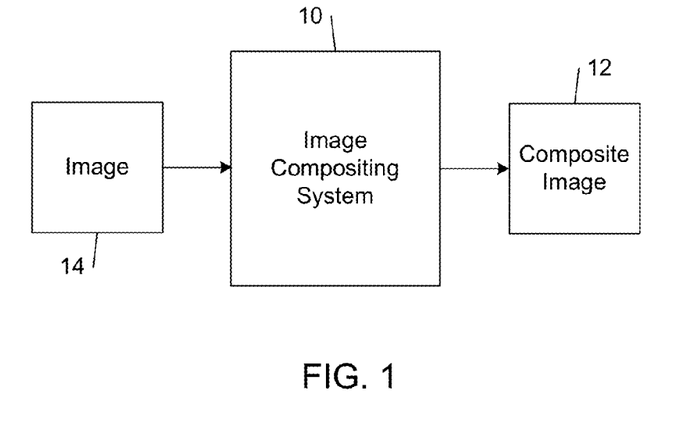
FIG. 1 is a block diagram of an example of an image compositing system for replacing an object or person in an image with different content.

FIG. 1 shows an example of an image compositing system 10 that generates a composite image 12 from an image 14. In particular, the image compositing system 10 can be used to segment a person or an object from an image 14 and replace them with other content to provide a composite image 12 that is a composite image. The image compositing system 10 uses background modeling to facilitate the image segmentation. In one example, the image compositing system 10 can segment a person or an object from an image 14 and manipulate and blend a different content into the segmented image 14 substantially at a location that correspond to the removed person or object to provide the composite image 12.

In another example of the process, the image compositing system 10 can use background models that are generated based on several images of the predetermined area that correspond to different times of a day. The background model is generated based on images of the predetermined area in the absence of traversing content. "Traversing content" herein refers to image content that is determined to traverse a predetermined area, as captured in one or more images of a set of images of the predetermined area. For example, the background models can be based on stored images of the predetermined area in the absence of traversing content taken at or corresponding to, e.g., 30 minute intervals, 1 hour, or 2 hour intervals. The traversing content includes the person or object of interest. In another example, the background models can be based on stored images of the predetermined area in the absence of traversing content taken at or corresponding to shorter time intervals, e.g., time intervals of 30 seconds or less, 1 second, 0.03 second, or less. The time intervals can be determined based on the expected use of the background model. For example, shorter time intervals (on the order of minutes, seconds, or fractions of a second) can be used for background models to be used with images in which traversing content moves on a timescale on the order of minutes or seconds, for example but not limited to, an amusement park ride or a motor vehicle that moves quickly through image frames. In another example, images of the predetermined area taken at combinations of short and long time intervals can be used for deriving background models, where bursts of images are separated by long time intervals. For example, 5 or 10 images can captured within fractions of a second (e.g., half a second), and 2 hours later, 5 or 10 more images can captured within fractions of a second, and so on.

The image compositing system 10 can segment a person or an object (target content) from an image 14, and in-paint the area after the person or object is removed with image pixels that substantially correspond to the time of day of image 14 based on the background model. The different content (including a different version of the same person or the same object, a different person, a different object, or a virtual character) can be inserted into substantially the original location of the person or object that was removed to provide the composite image 12 that is a composite image.

In other examples of the process, the image compositing system 10 can perform further adjustments in order to make the new person or object being inserted appear coherent with the rest of image 14. The different content to be inserted can be scaled to conform to the size and/or gesture/body position of the removed object. For example, the different content to be inserted can be scaled to a size similar to the original person or object in image 14. In an example, image compositing system 10 can scale the face of a virtual character face to a size similar to the original person or object that is removed.

In another example, image compositing system 10 can adjust the color tone of the new (different) content to be inserted according to the time of the day of image 14 and the person or object being replaced. For example, image compositing system 10 can adjust the color tone of a virtual character, or another person, or an animal, or another object, or other content, to be inserted into image 14.

In another example, image compositing system 10 can compensate for pose and skin-tone differences between the different content to be inserted and the person or object removed (the target content), can warp the different content to be inserted to fit into the space and pose of the removed person or object, and can embed the different content seamlessly into the segmented image 14 to provide composite image 12 that is a composite image.

Figure 2A:
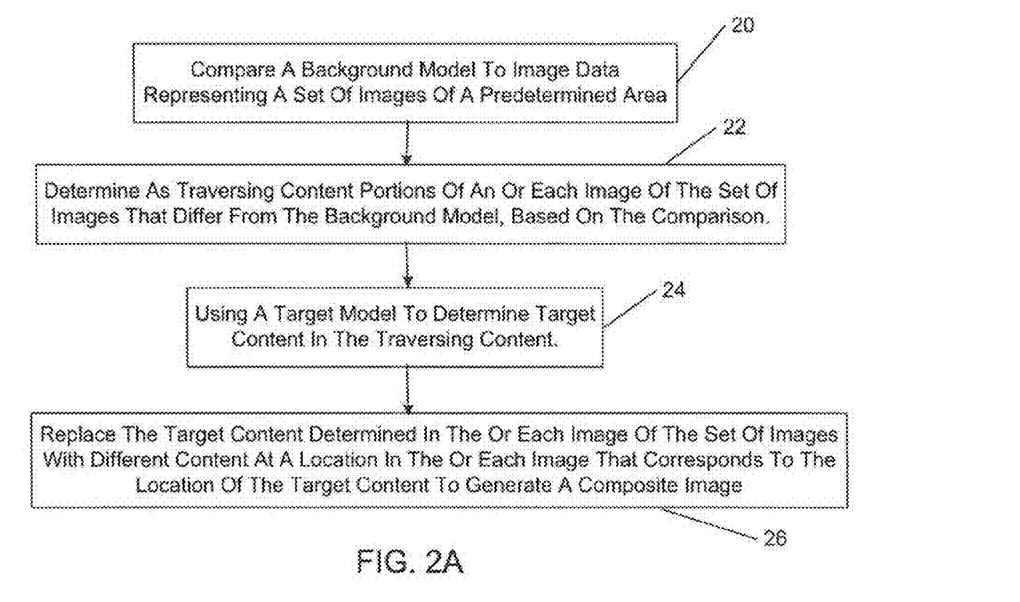
FIG. 2A shows a flow chart of an example process for generating a composite image.

FIG. 2A shows a flow chart of an example process for generating a composite image. In block 20, a background model of a predetermined area is compared to image data representing a set of captured images of the predetermined area. "Image data" herein includes data representative of image forming elements of the image and image values. The background model can be generated based on image data representing images of the predetermined area in the absence of traversing content. In block 22, based on the comparison, portions of the one or more image of the set of images that differs from the background model are determined as the traversing content. In block 24, a target content model is used to determine target content present in the traversing content. In block 26, the target content determined in the images is replaced with different content to provide a composite image.

The set of images can be from a collection of images of the predetermined area. The collection of images can include images of the predetermined area captured over different periods of time. The collection can include images captured by a fixed instrument that captures images of the predetermined area once a sensor or other device detects if an object or person has entered the predetermined area.

An example source of images 12 in the collection of images is images captured by an image sensor of, e.g., entertainment or sports celebrities, or reality television individuals. The images can be taken over a short span of time (minutes), or can have time stamps that extend over several days or weeks. An example of images that span a short space of time is images taken of one or more members of a family near an attraction at an amusement park, images taken of performers during a performance (e.g., a concert), or images taken at a retail store or kiosk. In an example use scenario, a system and method disclosed herein is applied to images in a database of images, such as but not limited to images of an area captured from imaging devices (such as but not limited to surveillance devices, or film footage) located at an airport, a stadium, a restaurant, a mall, outside building, etc., as described herein. In another example use scenario, a system and method disclosed herein is applied to images in a database of images, such as but not limited to images captured using imaging devices (such as but not limited to surveillance devices, or film footage) of an area located at an airport, a stadium, a restaurant, a mall, outside an office building or residence, etc. In another example use scenario, a system and method disclosed herein is applied to images of an advertisement traversing a web page, e.g., during a transitioning of the advertisement, including across a screen or a web page, to modify the advertisement, so that image data of a persons or objects of interest, including virtual characters, can be added to it or removed from the advertisement. In yet another example use scenario, a system and method disclosed herein is applied to frames of video, including a film, television program, or music video, to replace target content with image data of a persons or objects of interest, including virtual characters, including on a screen-by-screen, frame-by-frame, or pixel-by-pixel basis. In another example use scenario, a system and method disclosed herein is applied to images of an advertisement, including advertisement traversing a screen or a web page. In yet another example use scenario, a system and method disclosed herein is applied to frames of video, including a film, television program, or music video, to replace content traversing an area. An example implementation of a method disclosed herein is applying image compositing system 10 to images captured by an image capture device installed in a monitored location for replacing target content in any of the images with different content (including an image of an individual, and object, or a virtual character), to provide a composite image. In another example use scenario, a system and method disclosed herein can be used for generating composite images in a real-world environment and in real-time, since the background model disclosed herein can be used instead of a fixed backdrop, a blue-screen, a green-screen, or other artificial or staged environment. It will be appreciated that other uses are possible.

Figure 2B:
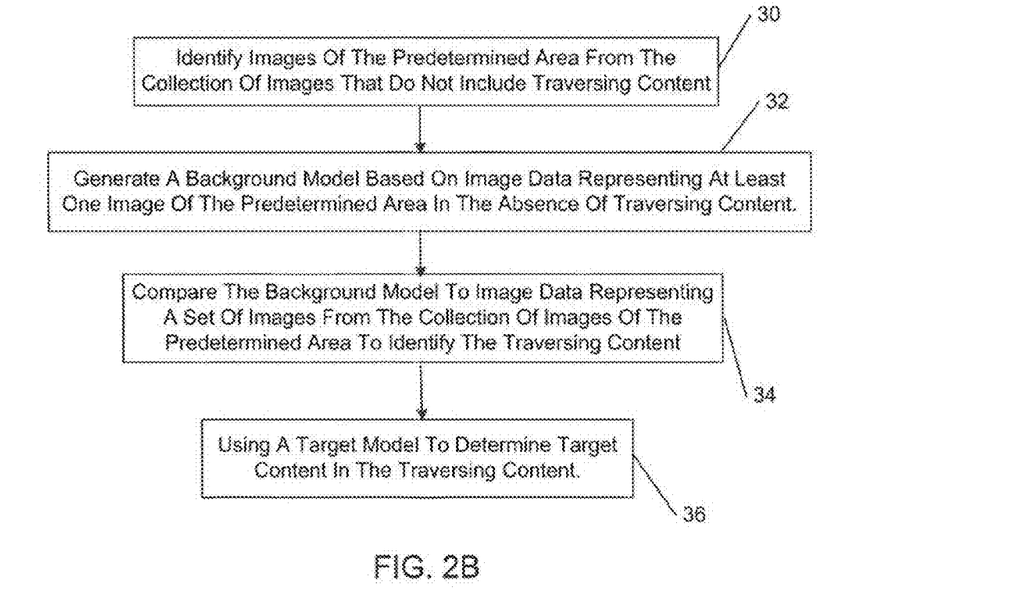
FIG. 2B shows a flow chart of an example process for generating a background model and using the background model to identify target content.

FIG. 2B shows a flow chart of an example process for generating a background model and using the background model and a target content model to identify target content. The operation of block 30 involves identifying images of the predetermined area from the collection of images that do not include traversing content. In block 32, a background model of the predetermined area is determined based on image data representing at least one image of the predetermined area in the absence of traversing content. In block 34, the background model is compared to image data representing a set of images from the collection of images of the predetermined area to identify traversing content. In block 36, a target content model is used to determine any target content present in the traversing content.

These images of the predetermined area that do not include traversing content can be images captured at a time when the predetermined area is known to be devoid of traversing content. The images can be captured over intervals of time when the predetermined area is known to be devoid of traversing content, to provide a subset of images representative of the predetermined area at different periods of time. For example, the background model developed to model an area during the morning can differ from the background model developed to model the area at mid-day, since lighting levels, positions of shadows, wind conditions, and other conditions, can vary throughout a given day. Similarly, different background models can be developed to provide a model of the area at different times in the afternoon and in the evening.

In an example, multiple candidates of the new (different) content to be inserted, having different gestures or body positions or object orientations or shapes, can be made available for insertion. Gesture, position, or orientation detection of the person or object to be segmented is performed, and the different content with a similar gesture, position or orientation as the segmented person or object is selected from among the multiple candidates for replacement. The multiple candidates of the different content can be stored, e.g., in a database, that is searched to provide the different content with a similar gesture, position or orientation as the segmented person or object.

In an example where the person or object is replaced with a virtual character, multiple candidates of the same virtual character with different gestures or body positions can be made available for insertion. Gesture/body position detection of the person to be segmented is performed, and a virtual character with a similar gesture as the segmented person or object is selected for replacement.

Using any of the systems and methods disclosed herein, image compositing system 10 can provide a fully automated process for replacing a person or object in an image with different content, including a different version of the same person or the same object, a different person, a different object, or a virtual character. In some examples, the image compositing system 10 outputs the composite image 12 (a composite image) by storing it in a data storage device (e.g., in a database), rendering it on a display (e.g., in a user interface generated by a software application program), or rendering it on a print medium (e.g., paper).

In general, image 14 can be any type of image, including amateur and professional photographs and commercially produced images. In one example use scenario, a user provides the image 14 in the form of a personal photograph that shows a person or an object against a backdrop, and a content provider provides the different content that is to be inserted into image 14. In this example use scenario, the image 14 can include images of a predetermined area for which the content provider has multiple images at different times of the day. The image compositing system 10 can be used to process the image 14 and outputs the composite image 12 (a composite image), according to any of the methods disclosed herein.

Segmentation of objects or persons in an image has many applications in image processing. In an example, this can be performed by blue screen matting. In blue screen matting, foreground objects are captured in front of a fixed colored backdrop, usually blue or green, and then are separated from the backdrop using simple techniques that take advantage of the known backdrop color. The simplicity of these techniques enables rapid foreground separation. However, in many real applications, the desired foreground information may be in a cluttered backdrop or area. A system that can automatically cut out a person or object and replace them with different content, such as but not limited to, a different version of the same person or the same object, a different person, a different object, or a virtual character, would be beneficial.

Provided herein are a system and method for removing a person or object from an image captured from a fixed camera of a fixed area with known content. The removed person or object can be replaced with different content, such as but not limited to, a different version of the same person or the same object, a different person, a different object, or a virtual character. A system and method are provided that can combine motion segmentation via background modeling (to determine traversing content) and face detection/skin detection to build a robust person/object segmentation system (to determine target content). Face detection is applied to detect at least one face region in the images, for example, using a face detection algorithm. The face detection can be applied to image data, including the image forming elements of an image. Skin region can be segmented based on information obtained from the detected face region. The skin tone of the detected face region can be extracted, for example, by clustering image data of pixels densely sampled in the skin regions. The extracted skin tone is used to remove skin regions from an image.

An example system for performing a method disclosed herein can include a database of a sequence of images of a scene (in some of which a person or an object appears), and a background modeling module that can use a sequence or set of these or other images of the scene for building a background model of the scene. The background modeling module can generate the background model(s) without having to move the person or object to be removed from the scene. As described above, different background models can be generated to model the area or scene at different times of the day. The background model(s) can be stored in the database. The example can include a processor for performing instructions to compare a background model to some images to determine the traversing content present. In some examples, the example system includes a fixed camera to capture a sequence of images of a scene where a person or an object may appear. Other example components of the example system include a component for selecting an image from a sequence of images such that the target content (such as a person) is facing the camera, or an object has a desired orientation, for example, at the center of the image area or the center of the image taken, and a traversing object detector that uses the learned background model to determine traversing objects (that may contain the foreground target person or object to be replaced) in a new image. A processor of a component of the system can be used to execute an image selection algorithm that selects an image from the image sequence such that the target content (e.g., a person or object) is at a specific location, orientation or pose (this selected image can be used for person or object replacement), and/or a target segmentation algorithm (such as but not limited to a person segmentation algorithm) that can segment a person or object from a background automatically (this person is usually not a part of the background), and/or a target replacement algorithm (such as but not limited to a person replacement algorithm) that can render a different content to replace the person or object to provide the composite image, including a different version of the same person or the same object, a different person, a different object, or a virtual character.

Following is a description of an example fixed camera capture system and an example of background modeling. The example system can include a fixed camera pointing to a scene where the person or object of interest (i.e., the person or object to be removed) may move in. Before capturing the image(s) of the person or object, the camera may capture a sequence of images of the scene without any traversing content (to provide multiple candidate images for construction of the background model). These image sequences can be used to build a background model of the scene using an adaptive background mixture model. See, e.g. C. Stauffer et al., 1999 "Adaptive Background Mixture Models for Real-time Tracking," *CVPR* II: 246-252. An example method for adaptive background modeling includes averaging the images over time, and creating a background model approximation that is similar to the current static scene except where motion occurs. In the adaptive background mixture model, the values of each pixel in an image (or scene) over time are considered as a "pixel process". The "pixel process" is a time series of pixel values, e.g. scalars for gray values or vectors for color images. A Gaussian mixture model can be used to model the pixel values:

$$P(X) = \sum_{i=1 \ to \ K} w_i N(X, \mu_i, \Sigma_i) \quad (1)$$

where K is the number of Gaussians to model each pixel (normally set to 3 to 5), $w_i$ is the weight for each Gaussian, N is a Gaussian probability density function $$N(X, \mu, \Sigma) = \frac{1}{(2\pi)^{n/2}|\Sigma|^{1/2}} e^{-\frac{1}{2}(X-\mu)^T \Sigma^{-1}(X-\mu)}, \mu_i$$

and $\Sigma_i$ are the mean and covariance matrix of each Gaussian distribution.

After the background model is learned, the system can determine traversing objects in a new image. For example, the background model can be learned using the adaptive background modeling method described above. A system and method herein includes determining the traversing content in an image as those portions of the image that differ from the background model, based on a comparison of the image to the background model. In this manner, the system and method provides for traversing object determination, including a person traversing a selected (predetermined) area. Each image captured when traversing content enters and moves in a predetermined area can differ from the background model at the portions of the images where the traversing content is present. Determination of the traversing object (including a person) can be done on a pixel-by-pixel basis. When a new image is analyzed, each pixel of the new image is analyzed to determine whether it is a "traversing" pixel (i.e., if the pixel differs from the corresponding background model pixel to indicate the presence of target content). If a pixel is in a foreground, since a fixed camera is used, the appearance of the pixel can be very different from its corresponding background model pixel. More specifically, every new pixel value of the new image, Xt, is checked against the existing K Gaussian distributions corresponding to its background model for that pixel, until a match is found. A match can be defined as a pixel value within 2.5 standard deviations of a distribution. The determined traversing content area may contain different foreground objects, for example the person or object of interest. The determined traversing content area may also contain other traversing objects, for example the seat the person is sitting on, such as but not limited to, in a rollercoaster in an amusement park, or in a motor vehicle, e.g., a car or van.

Also described is an example method for selection of an image from a sequence of images for processing. After a sequence of images are captured, one or more candidate images are selected for the person or object replacement. In one example, face detection is applied to each image of the sequence to detect the face of the person to be replaced and the images that have face detection around a pre-defined area are selected. The predefined area can be the area at or near the center of an image. Additional image quality measures can be used to further select the best candidate image. Such measures include: image quality assessment and face expression analysis.

Figure 3:
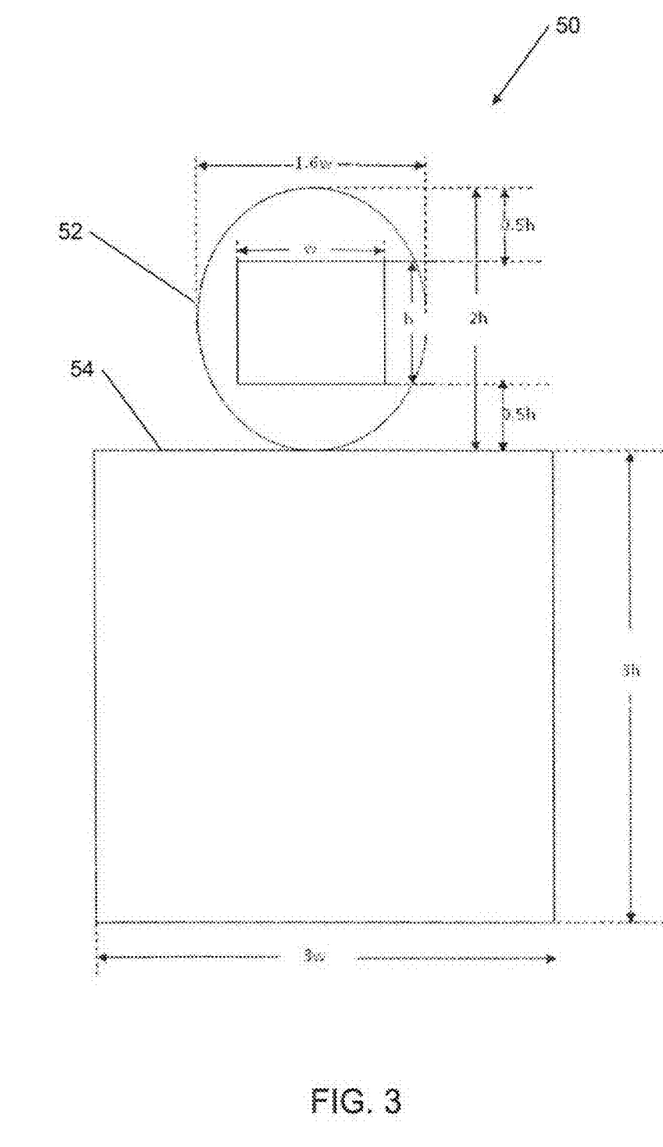
FIG. 3 illustrates an example target content model constructed based on a face detection box.
Figure 4A:
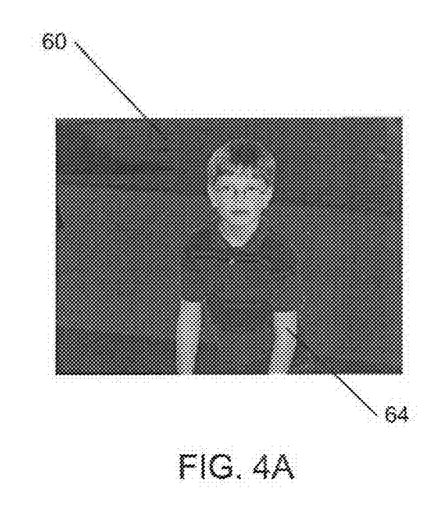
FIGS. 4A and 4B show example images that include target content from a predetermined area.
Figure 4B:
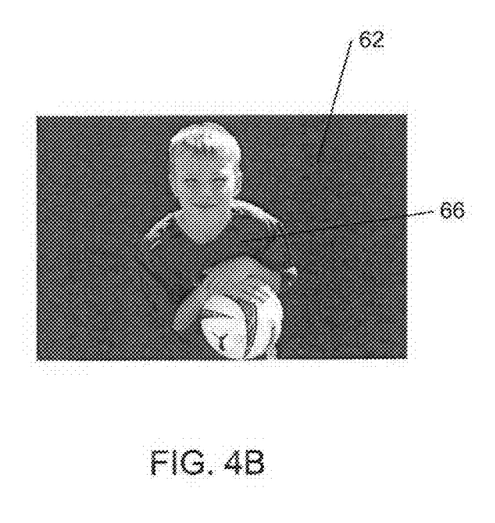

Person/object segmentation can be performed to determine the target content in the traversing content and segment the target content from an image. For the detected foreground area, the person or object of interest is located, and segmented out of the image. In one example, the person/object segmentation can be performed in a four step process. First, the person/object is located based on a target content model (such as a person model). The target content model can be constructed as follows. Face detection can used to locate the face of the person or object of interest in an image. A rough model of the person/object is built to locate the person/object in the image. For example, a rough target content model (such as a person or object model) can be built to segment the body of the person or object. As another example, a target content model (such as a person or object model) is constructed based on a face detection box of size w×h. FIG. 3 illustrates an example target content model 50 constructed based on a head 52 located within a box of dimensions 1.6 w×2 h centered at the face detection box center. FIG. 3 shows an example computation of the dimensions of a bounding area 54 that can be part of the target content model for a person model, computed based on the dimensions of the face detection box. In the example of FIG. 3, the bounding area 54 is computed with dimensions 3 h×3 w. A target content model to use for an object, such as an animal, can be similarly constructed using the dimensions of a head detection box for the animal, and a bounding area of related dimensions. Foreground motion detection can be combined with the target content model. Skin detection and cloth segmentation, where applicable, can be used to give a rough mask of the person or object of interest, and this mask can be provided to a segmentation algorithm to segment the person or object of interest from the background. For example, a Graphcut segmentation algorithm can be used. FIGS. 4A and 4B show example images with predetermined areas 60,62 that one or more background models can be used to model, and also show examples of traversing content 64,66 that can be determined in predetermined areas 60,62. Target content can be determined from the traversing content 64,66. For example, in FIG. 4B, the target content can be determined as the child but not the ball. The systems and methods described herein can be applied to the images of FIGS. 4A and 4B.

If a user does not obtain the desired result from the image segmentation, an interactive refinement process can be performed to enable the user to obtain a more accurate segmentation. The interactive refinement process can be performed using two types of strokes: a foreground stroke and a background stroke. A system can be provided with a foreground stroke for use if some foreground area is incorrectly identified as background in the background model. The foreground strokes can be used to correct them and label this and possibly other similar areas as a foreground. A system can be provided with a background stroke for use if some background area is misidentified as foreground by the segmentation algorithm. The background strokes can be provided to use to clear them. A user can edit using only the foreground stroke, only the background stroke, or any mixture of the foreground stroke and the background stroke.

The different content can be inserted into the segmented image as follows. After the person or object of interest is segmented out of an image, a different version of the same person or the same object, a different person, a different object, or a virtual character can be inserted. For example, a virtual character (such as a cartoon character) can be inserted to replace the removed person or object. First, the area of the image left after the person or object is removed is in-painted with the background pixels (based on a pertinent background model). The background model can be selected based on the time of day. For example, since the background scene may have a different appearance at different times in a day, several different background models corresponding to different times of a day can be stored. For example, images of the predetermined area stored at, e.g., 2 hour intervals (or other time intervals as described herein) can be used to build background models. The different content can be inserted into the original position of the person or object that is removed. To make the new content (i.e., the inserted different content) appear coherent with the remainder of the image, several adjustment can be performed. The different content can be scaled to conform to the size of the person or object that is removed. In one example, the face of a virtual character, or a different person to be inserted, can be scaled to conform to a size similar to that of the original person or object removed from the image. The color tone of the different content to be inserted can be adjusted according to the time of the day and the person or object being replaced. Multiple candidates of different content, having different gestures, orientations, or body positions may be made available for evaluation and selection of a candidate for insertion. In an example where the person or object is replaced with a virtual character, the same virtual character with different gestures, orientations, or body positions may be made available for evaluation and selection of a candidate for insertion. An example method for detecting the gesture and/or body position of the segmented from the image is disclosed in Nickel et al., 2003, "Pointing gesture recognition based on 3D-tracking of face, hands and head orientation", ACM Special Interest Group. In one example, a virtual character with a gesture or orientation most similar to the segmented person or object is selected for replacement. In another example, a different person or object with a gesture or orientation most similar to the segmented person or object is selected for replacement.

An example system and method that can be used for segmentation of a person or object from an image is described as follows. The image compositing system 10 can be used to segment the person or object from the image. The image compositing system 10 can segment the person or object from the image 14 based on a model of the image as a mixture of at least two image layers, where one or more of the image layers are components of a foreground corresponding to the person or object to be replaced and one or more other ones of the image layers are components of a background corresponding to parts of the image outside the person or object to be replaced. In some examples, the source image ($I_i$) is modeled as a convex combination of K image layers $F^1, \ldots, F^K$ in accordance with equation (2):

$$I_i = \sum_{k=1}^{K} \alpha_i^k F_i^k, \tag{2}$$

where the K vectors $\alpha_i^k$ are the matting components of the source image that specify the fractional contribution of each layer to the final color of each pixel of the source image. The alpha matte is determined from the matting components based on a specification of the particular ones of the matting components that are part of the foreground. For example, if $\alpha^{k1}, \ldots, \alpha^{kn}$ are designated as foreground components, then the alpha matte is obtained simply by adding these components together (i.e., $\alpha = \alpha^{k1} + \ldots \alpha^{kn}$).

In some of these examples, the source image ($I_i$) is modeled as a mixture of two images (i.e., a foreground image F and a background image B) in accordance with equation (3):

$$I(x) = \alpha(x)F(x) + (1-\alpha(x))B(x) \tag{3}$$

where x is a pixel location and $\alpha \in [0, 1]$ is an alpha matte that quantifies the mixture. In a typical initialization map, $\alpha$ is either 0 or 1 rather than taking intermediate values. Such an initialization map performs "hard" classification of pixels either fully belonging to the foreground or the background.

The image compositing system 10 can initially determine an initialization map that identifies regions of the image 14 that correspond to the foreground and that identifies regions of the image 14 that correspond to the background. The initialization map is designed to provide rough designations of both foreground and background regions, where regions of the image 14 that are highly likely to be parts of a face are marked as the foreground (e.g., "white") are regions that are highly likely to be non-facial areas are marked as the background (e.g., "black"). The remaining unmarked regions of the image 14 are left as currently unknown; these regions will be labeled as foreground or background in the subsequent alpha matte generation process. The image compositing system 10 typically determines the initialization map by identifying regions of facial image content and regions non-facial image content (e.g., hair image content) in the image 14 based on locations of respective ones of the facial features.

The identified foreground and background regions in the initialization map are used as initial seed points to get an enhanced initialization map. In some examples, the identified foreground and background regions in the initialization map are used as initial seed points for a k-means clustering algorithm which outputs an enhanced initialization map.

The image compositing system 10 derives the alpha matte from the enhanced initialization map. As explained above, the alpha matte specifies respective contributions of the image layers to the foreground component and background component. The image compositing system 10 refines the enhanced initialization map by applying the enhanced initialization map as a tri-map in an image matting process that generates the alpha-map, which conveys the desired segmentation of the source head image. The image matting process classifies the unknown regions of the enhanced initialization map as foreground or background based on color statistics in the known foreground and background regions. In general, a variety of different supervised image matting processes may be used to generate the alpha matte from the enhanced initialization map, including Poisson matting processes (see, e.g., J. Sun et al., "Poisson Matting," ACM SIGGRAPH, 2004) and spectral matting processes (see, e.g., A. Levin at al., "Spectral Matting," IEEE Transactions PAMI, October 2008). Image matting processes of these types are able to produce high quality segmentation maps of fine details of head image, such as regions of hair.

An example system and method that can be used for color tone adjustment of the different content (to be inserted) is described as follows. The different content can be a different person (i.e., different from the person removed) or a virtual character. The color tone adjustment can be performed based on a skin tone detected for the person removed from the image. The image positing system 10 can generate a source skin map that segments skin areas from other areas in the image 14. In some examples the source skin map includes for each pixel of the input image a respective skin probability value indicating a degree to which the pixel corresponds to human skin. A characteristic feature of the source skin map is that all pixels of the image 14 having similar values are mapped to similar respective skin probability values in the skin map. As used herein with respect to pixel values, the term "similar" means that the pixel values are the same or nearly the same and appear visually indistinguishable from one another. This feature of the skin map is important in, for example, pixels of certain human-skin image patches that have colors outside of the standard human-skin tone range. This may happen, for example, in shaded face-patches or alternatively in face highlights, where skin segments may sometimes have a false boundary between skin and non-skin regions. The skin map values vary continuously without artificial boundaries even in skin patches trailing far away from the standard human-skin tone range.

The image compositing system 10 may ascertain the skin probability values indicating the degrees to which the input image pixels correspond to human skin in a wide variety of different ways.

In some examples, the image compositing system 10 computes the pixel intensity distributions of skin areas using the facial feature points. Samples from areas such as cheek or forehead are selected as those points that are guaranteed to be skin areas. From those samples, the image compositing system 10 estimates conditional densities p(I|skin) where I is the pixel intensity. The image compositing system 10 then obtains the posterior probability $$p(\text{skin}|I) = \frac{p(I|\text{skin})p(\text{skin})}{p(I)} \propto \frac{p(I|\text{skin})}{p(I)}, \quad (4)$$

where p(I) is obtained from the histogram of the pixel intensities for the given image. This posterior probability is used as a multiplier to the skin color compensation such that only the pixels that are likely to be from the skin pixels are modified while non-skin pixels are not changed. In some of these examples, the image compositing system 10 determine the skin map by thresholding the posterior probabilities p(skin|I) with an empirically determined threshold value.

In other examples, the image compositing system 10 ascertains the per-pixel human-skin probability values from human-skin tone probability distributions in respective channels of a color space (e.g., RGB, YCC, and LCH). For example, in some examples, the image compositing system 10 ascertains the per-pixel human-skin tone probability values from human-skin tone probability distributions in the CIE LCH color space (i.e., P(skin|L), P(skin|C), and P(skin|H)). These human-skin tone probability distributions are approximated by Gaussian normal distributions (i.e., $G(p,\mu,\epsilon r)$) that are obtained from mean ($\mu$) and standard deviation ($\epsilon r$) values for each of the p=L, C, and H color channels. In some examples, the mean ($\mu$) and standard deviation ($\epsilon r$) values for each of the p=L, C, and H color channels are obtained from O. Martinez Bailac, "Semantic retrieval of memory color content", PhD Thesis, Universitat Autonoma de Barcelona, 2004. The image compositing system 10 ascertains a respective skin probability value for each pixel of the image 14 by converting the image 14 into the CIE LCH color space (if necessary), determining the respective skin-tone probability value for each of the L, C, and H color channels based on the corresponding human-skin tone probability distributions, and computing the product of the color channel probabilities, as shown in equation (5):

$$P(\text{skin}|L,C,H) \approx G(L,\mu_L,\epsilon r_L) \times G(C,\mu_C,\epsilon r_C) \times G(H,\mu_H,\epsilon r_H) \quad (5)$$

In some of these other examples, the skin map values are computed by applying to the probability function P(skin|L, C,H) a range adaptation function that provides a clearer distinction between skin and non-skin pixels. In some of these examples, the range adaptation function is a power function of the type defined in equation (6):

$$M_{SKIN}(x,y) = P(\text{skin}|L(i),C(i),H(i))^{1/\gamma} \quad (6)$$

where $\gamma > 0$ and $M_{SKIN}(x,y)$ are the skin map values at location (x,y). In one example, $\gamma = 32$. The skin map function defined in equation (6) attaches high probabilities to a large spectrum of skin tones, while non-skin features typically attain lower probabilities.

Based on the skin maps, the image compositing system 10 can color-adjusts the different content to be inserted.

Figure 5A:
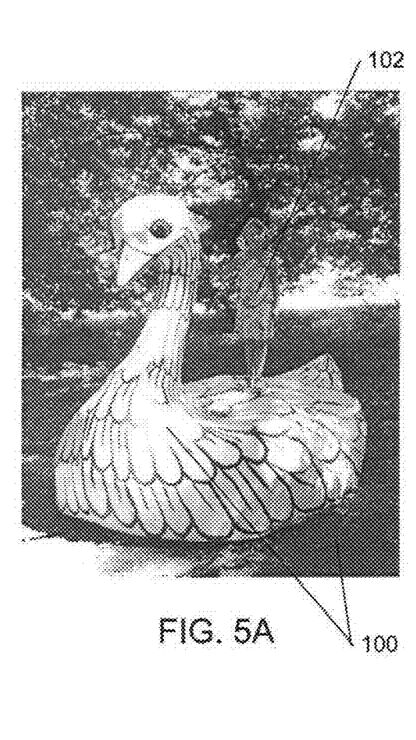
FIGS. 5A-C illustrate an example generation of a composite image.
Figure 5B:
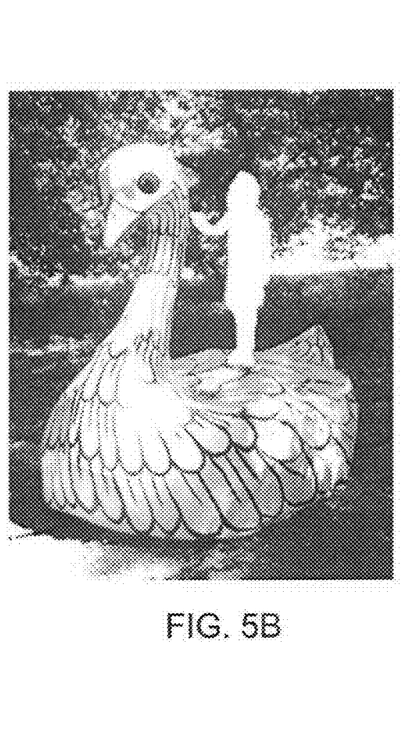
Figure 5C:
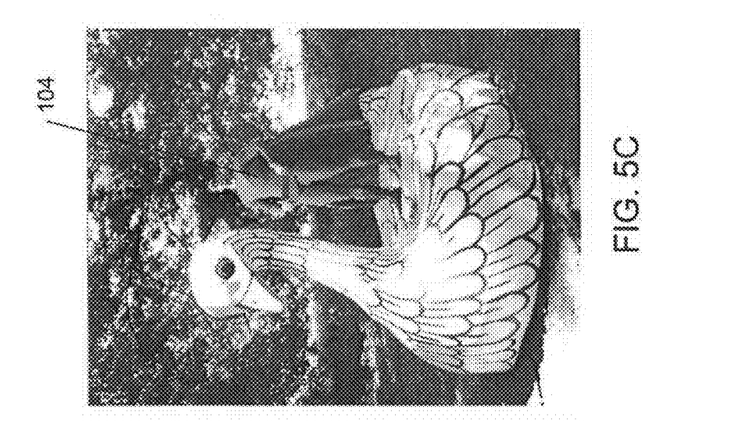

FIGS. 5A-C illustrate an example application of a system and method herein for generation of a composite image. FIG. 5A shows an example images with predetermined area 100 that one or more background models can be used to model. The example traversing content 102 that can be determined in predetermined area 100. As described herein, the one or more background models can be generated based on images of the predetermined area 100 in the absence of traversing content 102. The image of FIG. 5A is compared to a background model that models the predetermined area 100, and the traversing content 102 is determined as the portions of FIG. 5A that differs from the background model. A target content model can be used to determine the target content in the traversing content 102. A person model, such as the model depicted in FIG. 3, can be used to determine the target content. In the example of FIG. 5A, the target content is determined to be the same as the traversing content 102. However, in another example, the target content can differ from the traversing content. For example, the traversing content can be a vehicle or amusement ride with a person sitting inside, while the target content is the person. FIG. 5B shows an example result of image segmentation performed to remove the determined target content from an image. FIG. 5C shows a composite image generated from replacing the target content determined in image FIG. 5A with different content 104 (in this example, a graphic of an action figure) at a location in the image that corresponds to the location of the target content. Portions of the composite image that the different content does not cover can be replaced with portions of the background model. For example, the portions in FIGS. 5A and 5B where the extended arm of the target content occupied can be replaced with portions of the background model since, as shown in FIG. 5O, the different content (the graphic of the action figure) does not present an extended arm.

In general, the image compositing system 10 typically includes one or more discrete data processing components, each of which may be in the form of any one of various commercially available data processing chips. In some implementations, the image compositing system 10 is embedded in the hardware of any one of a wide variety of digital and analog computer devices, including desktop, workstation, and server computers. In some examples, the image compositing system 10 executes process instructions (e.g., machine-readable code, such as computer software) in the process of implementing the methods that are described herein. These process instructions, as well as the data generated in the course of their execution, are stored in one or more computer-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

Figure 6:
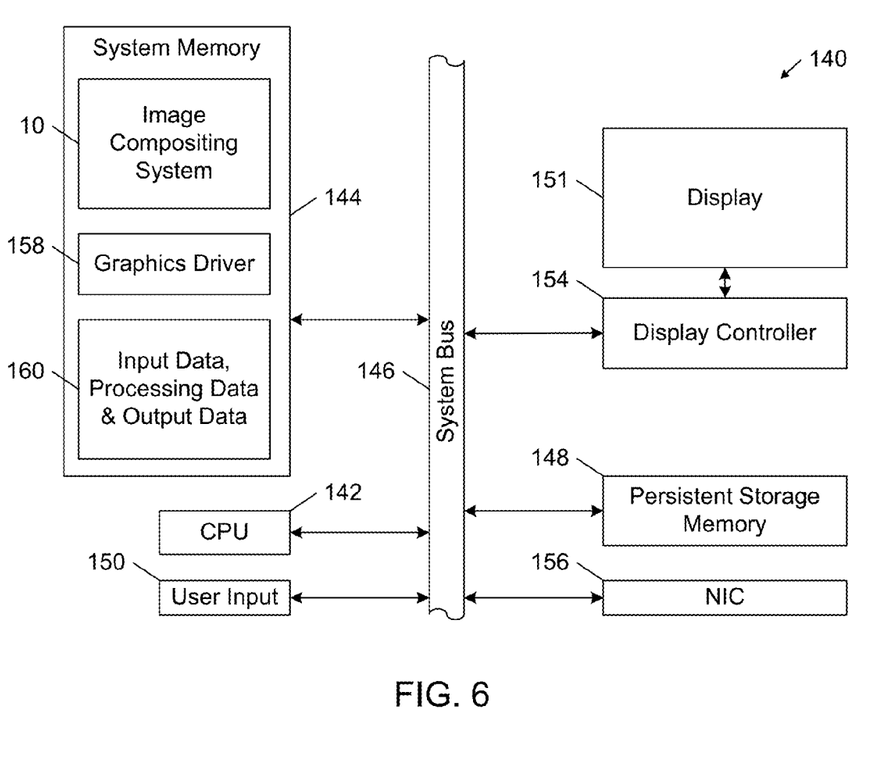
FIG. 6 is a block diagram of an example of a computer that incorporates an example of the image compositing system of FIG. 1.

FIG. 6 shows an example of a computer system 140 that can implement any of the examples of the image compositing system 10 that are described herein. The computer system 140 includes a processing unit 142 (CPU), a system memory 144, and a system bus 146 that couples processing unit 142 to the various components of the computer system 140. The processing unit 142 typically includes one or more processors, each of which may be in the form of any one of various commercially available processors. The system memory 144 typically includes a read only memory (ROM) that stores a basic input/output system (BIOS) that contains start-up routines for the computer system 140 and a random access memory (RAM). The system bus 146 may be a memory bus, a peripheral bus or a local bus, and may be compatible with any of a variety of bus protocols, including PCI, VESA, Microchannel, ISA, and EISA. The computer system 140 also includes a persistent storage memory 148 (e.g., a hard drive, a floppy drive, a CD ROM drive, magnetic tape drives, flash memory devices, and digital video disks) that is connected to the system bus 146 and contains one or more computer-readable media disks that provide non-volatile or persistent storage for data, data structures and computer-executable instructions.

A user may interact (e.g., enter commands or data) with the computer system 140 using one or more input devices 150 (e.g., a keyboard, a computer mouse, a microphone, joystick, and touch pad). Information may be presented through a user interface that is displayed to a user on the display 151 (implemented by, e.g., a display monitor), which is controlled by a display controller 154 (implemented by, e.g., a video graphics card). The computer system 140 also typically includes peripheral output devices, such as speakers and a printer. One or more remote computers may be connected to the computer system 140 through a network interface card (NIC) 156.

As shown in FIG. 6, the system memory 144 also stores the image compositing system 10, a graphics driver 158, and processing information 160 that includes input data, processing data, and output data. In some examples, the image compositing system 10 interfaces with the graphics driver 158 to present a user interface on the display 151 for managing and controlling the operation of the image compositing system 10.

Many modifications and variations of this invention can be made without departing from its spirit and scope, as will be apparent to those skilled in the art. The specific examples described herein are offered by way of example only, and the invention is to be limited only by the terms of the appended claims, along with the full scope of equivalents to which such claims are entitled.

As an illustration of the wide scope of the systems and methods described herein, the systems and methods described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and 'on' unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

All references cited herein are incorporated herein by reference in their entirety and for all purposes to the same extent as if each individual publication or patent or patent application was specifically and individually indicated to be incorporated by reference in its entirety herein for all purposes.

Discussion or citation of a reference herein will not be construed as an admission that such reference is prior art to the present invention.

What is claimed is:

1. A method comprising:

determining, via a computing system, traversing content in a set of images based on a comparison between a background model of the set of images to image data representing the set of images;

using a target content model to determine target content in the traversing content; and generating a composite image by replacing the target content with different content, wherein generating the composite image includes:

segmenting the target content from the set of images based on a model of the set of images as a mixture of at least two image layers, wherein one of the least two image layers includes components of a foreground corresponding to the target content and the other of the at least two image layers includes components of a background corresponding to content of the set of images other than the target content;

determining an initialization map that identifies a first region of the set of images corresponding to the foreground and a second region of the set of images corresponding to the background;

deriving from the initialization map an alpha matte specifying respective contributions of the at least two image layers to the foreground and to the background; and performing a weighted blending of replacement content into the set of images in accordance with the alpha matte.

2. The method of claim 1, further comprising determining the background model by averaging image data from at least two images of a predetermined area in the absence of the traversing content.

3. The method of claim 1, comprising determining the background model by modeling, using a Gaussian mixture model, image data from at least one image of a predetermined area in the absence of the traversing content.

4. The method of claim 1, wherein the traversing content is determined as portions of the set of images in a predetermined region of the predetermined area that differ from the background model.

5. The method of claim 1, wherein the different content is a different version of the target content, or an image of a person, a different object, or a virtual character.

6. The method of claim 1, wherein the background model is generated based on image data representing a redetermined area in the absence of the traversing content.

7. Apparatus, comprising:

a memory storing computer-readable instructions; and a processor coupled to the memory, to execute the instructions, and based at least in part on the execution of the instructions, to:

determine, via a computing system, traversing content in a set of images based on a comparison between a background model of the set of images to image data representing the set of images;

use a target content model to determine target content in the traversing content; and generate a composite image by replacing the target content with different content, wherein generating the composite image includes:

segmenting the target content from the set of images based on a model of the set of images as a mixture of at least two image layers, wherein one of the least two image layers includes components of a foreground corresponding to the target content and the other of the at least two image layers includes components of a background corresponding to content of the set of images other than the target content;

determining an initialization map that identifies a first region of the set of images corresponding to the foreground and a second region of the set of images corresponding to the background;

deriving from the initialization map an alpha matte specifying respective contributions of the at least two image layers to the foreground and to the background; and perform a weighted blending of the different content into the set of images in accordance with the alpha matte.

8. The apparatus of claim 7, wherein the set of images is generated from a collection of images of a predetermined area, wherein the background model is generated based on image data representing the predetermined area in the absence of the traversing content, and wherein the processor is further to determine the background model by averaging image data from at least two images from the collection of images that does not comprise the traversing content.

9. The apparatus of claim 7, wherein the set of images is generated from a collection of images of predetermined area and wherein processor is further to determine the background model by modeling image data from at least one image from the collection of images using a Gaussian mixture model.

10. At least one computer-readable medium storing computer-readable instructions when executed cause a processor of a computer to:

determine traversing content in a set of images based on a comparison between a background model of the set of images to image data representing the set of images;

use a target content model to determine target content in the traversing content and generate a composite image by replacing the target content with different content, wherein generating the composite image includes:

deriving from an initialization map an alpha matte specifying respective contributions of at least two image layers to a foreground and to a background; and perform a weighted blending of the different content into the set of images in accordance with the alpha matte.

11. The at least one computer-readable medium of claim 10, wherein the set of images is generated from a collection of images of a determined area, and wherein the computer-readable instructions when executed further cause the processor to determine the background model by averaging image data from at least two images from the collection of images that does not comprise the traversing content.

12. The at least one computer-readable medium of claim 10, wherein the set of images is generated from a collection of images of a predetermined area, and wherein the computer-readable instructions when executed further cause the processor to determine the background model by modeling image data from at least one image from the collection of images using a Gaussian mixture model.

* * * * *

UNITED STATES PATENT AND TRADEMARK OFFICE
CERTIFICATE OF CORRECTION

| | | |
|---|---|---|
| PATENT NO. | : 8,913,847 B2 | Page 1 of 1 |
| APPLICATION NO. | : 13/642345 | |
| DATED | : December 16, 2014 | |
| INVENTOR(S) | : Feng Tang et al. | |

It is certified that error appears in the above-identified patent and that said Letters Patent is hereby corrected as shown below:

In the Claims

In column 15, line 50, in Claim 6, delete "redetermined" and insert -- predetermined --, therefor.

In column 16, line 30, in Claim 9, delete "of" and insert -- of a --, therefor.

In column 16, line 30, in Claim 9, delete "area" and insert -- area, --, therefor.

In column 16, line 31, in Claim 9, delete "wherein" and insert -- wherein the --, therefor.

In column 16, line 41, in Claim 10, delete "content" and insert -- content; --, therefor.

In column 16, line 53, in Claim 11, delete "determined" and insert -- predetermined --, therefor.

Signed and Sealed this
Fifth Day of May, 2015

Michelle K. Lee
*Director of the United States Patent and Trademark Office*